United States Patent [19]

Rolf

[11] 4,131,034
[45] Dec. 26, 1978

[54] ELECTROMOTIVELY DRIVEN DRIVE EQUIPMENT, ESPECIALLY FOR KITCHEN APPLIANCES OR THE LIKE

[75] Inventor: Mayer Rolf, Giengen, Germany

[73] Assignee: Bosch-Siemens Hausgeräte GmbH, Stuttgart, Germany

[21] Appl. No.: 742,255

[22] Filed: Nov. 16, 1976

[30] Foreign Application Priority Data

Nov. 19, 1975 [DE] Fed. Rep. of Germany ....... 2551842

[51] Int. Cl.² ............................ F16H 1/30; B01F 7/00
[52] U.S. Cl. ...................................... 74/799; 366/288; 74/660
[58] Field of Search ................. 74/800, 799, 797, 423, 74/421 A; 259/102, 114, 85, 64

[56] References Cited

U.S. PATENT DOCUMENTS

| | | | |
|---|---|---|---|
| 676,234 | 6/1901 | Humpage et al. | 74/799 |
| 1,475,978 | 12/1923 | Westerman | 259/102 |
| 1,491,831 | 4/1924 | Trust et al. | 259/102 |
| 2,024,282 | 12/1935 | Geiger | 259/102 |
| 2,046,784 | 7/1936 | Krause | 259/102 X |
| 2,185,155 | 12/1939 | Meeker et al. | 259/102 |
| 2,616,673 | 11/1952 | Van Guilder | 259/102 |
| 3,367,210 | 2/1968 | Scott | 74/410 X |

FOREIGN PATENT DOCUMENTS

| | | | |
|---|---|---|---|
| 204720 | 8/1959 | Austria | 259/102 |
| 1079001 | 11/1954 | France | 259/102 |

Primary Examiner—Samuel Scott
Assistant Examiner—Lance W. Chandler
Attorney, Agent, or Firm—Herbert L. Lerner

[57] ABSTRACT

Electromotively driven drive unit with a planetary gearing having bevel-gear toothing and including a revolving planet gear having an inclined axis intersecting with the axis of a central gear of the planetary gearing, and a gear box for the planetary gearing having a plurality of journal shafts to which tools and devices drivable with varying rotary speeds are connectible, the improvement therein includes an internally toothed outer ring gear disposed concentrically to the central gear of the planetary gearing, the planet gear being in meshing engagement both with the teeth of the central gear and the teeth of the ring gear, the planet gear with a pin formed thereon being seated in a bearing member rotatably disposed on the axis of the central gear, the planet gear moving together with the bearing member during a whirling movement thereof about the central gear.

9 Claims, 10 Drawing Figures

ELECTROMOTIVELY DRIVEN DRIVE EQUIPMENT, ESPECIALLY FOR KITCHEN APPLIANCES OR THE LIKE

The invention relates to an electromotively driven drive unit, especially for kitchen appliances or the like, with a planetary gearing having bevel-gear toothing and including a revolving planet gear having an inclined axis intersecting with the axis of a central gear of the planetary gearing, as well as a gear box for the planetary gearing having a plurality of journal shafts to which tools and devices, drivable with varying rotary speeds such as kneading hooks or blades, meat grinders or the like, are connectible.

In the heretofore known drive units of this art, it has been customary to mount the planet gear on a laterally projecting entrainer driven by the central main drive shaft and to let the planet gear mesh with an internally toothed gear ring which is disposed concentrically or coaxially to the main drive shaft. Because of the planet gear mounted in this manner laterally of the main drive shaft on the entrainer, the diameter of the ring gear must be many times greater than that of the planet gear so that, in this manner, an especially high transmission ratio is produced. This presupposes a very low rotary speed of the main drive shaft for the usually low rotary speeds with which tools for processing material to be mixed in a mixing bowl are driven. Such a low rotary speed is attainable, however, only if a relatively large-sized and heavy, slow-running drive motor is used or if, when using a smaller, rapidly-running motor, a suitable intermediate transmission with several intermediate stages between drive motor and drive shaft is engaged. In the first case, the disadvantage arises of having to contend with a relatively large, heavy and therefore unwieldy drive unit, while in the second case, the intermediate connection of a transmission results in increased expense and also signifies an undesired space and weight increase. This is especially disadvantageous, since these relatively large and heavy drive units are to be used specifically only in the household and, thus, especially for smaller households, are hardly attractive.

It is accordingly an object of the invention to provide a electromotively driven drive unit which avoids the foregoing disadvantages of the heretofore known drive units of this general type. More specifically, it is an object of the invention to provide such a drive unit that is compact, especially light and simple to handle and which nevertheless offers the possibility of driving a large number of various tools and devices at different rotary speeds.

With the foregoing and other objects in view, there is provided, in accordance with the invention, an electromotively driven drive unit with a planetary gearing having bevel-gear toothing and including a revolving planet gear having an inclined axis intersecting with the axis of a central gear of the planetary gearing, and a gear box for the planetary gearing having a plurality of journal shafts to which tools and devices drivable with varying rotary speeds are connectible, includes an internally toothed outer ring gear disposed concentrically to the central gear of the planetary gearing, the planet gear being in meshing engagement both with the teeth of the central gear and the teeth of the ring gear, the planet gear with a pin formed thereon being seated in a bearing member rotatably disposed on the axis of the central gear, the planet gear moving together with the bearing member during a whirling movement thereof about the central gear.

With the foregoing construction of the drive unit of the invention, there is provided in a simple manner, an exceptionally compact and space-saving planetary gearing which, due to the great reducing ratio thereof, permits the employment of lighter and lower-priced rapidly-running small motors and thereby promoting a reduction in the general dimensions and weight of such a drive unit in an advantageous manner. Because of the reduction stages occurring with the inventive construction of the planetary gearing, the possibility is simultaneously afforded to employ the most varied tools and devices in an advantageous manner for the drive, in the narrowest space through several journal shafts, the rotary speeds corresponding to the individual reduction stages.

In accordance with another feature of the invention, the drive unit includes a hub-like appendage formed at the outer ring gear, the bearing member moving with the planet gear being mounted in the hub-like appendage.

Through the inventive mounting of the bearing member in a hub-like appendage formed at the outer ring gear, it is possible especially to keep the axial dimension of the planetary gearing small and thereby to limit the structural height thereof as well as the structural height of the entire drive to a minimal value especially favorable and handy for use in the household.

In accordance with a further feature of the invention, the pin formed on the planet gear extends through the bearing member and is constructed as a coupling member for receiving thereon a shaft of a rotatable tool.

This last-mentioned inventive construction of the pin formed on the planet gear as a coupling member for the tool contributes also in an advantageous manner to keeping the total structural height of the planetary gearing at a small value.

In accordance with an added feature of the invention, the bearing member moving with the planet gear has entrainer elements and serves as a journal shaft with a greatly reduced rotary speed.

Due to the foregoing construction of the bearing member moving with the planet gear, rotary speeds and torques greatly graduated from one another are capable of being taken off various journal shafts in the narrowest space at the planetary gearing, so that the drive unit provided with the planetary gearing constructed in accordance with the invention is suited for driving a multiplicity of different tools and devices and accordingly complies with the most varied requirements in the household in an especially favorable manner.

In accordance with yet another feature of the invention, the entrainer elements are located at the end face of the bearing member, the end face of the bearing member being in substantial alignment with the end face of the hub-like appendage.

In accordance with yet a further feature of the invention, the outer ring gear with the hub-like appendage are components of the gear box surrounding the planetary gearing.

In accordance with an added feature of the invention, the drive unit includes a worm gear, the central gear being seated laterally coaxially at the worm gear.

In accordance with the additional feature of the invention, the worm gear seated at the central gear is provided with a bearing pin on a side thereof facing away from the central gear, and the worm gear is formed with a bore, on the side thereof on which the central gear is located, for receiving therein a bearing pin seated in the axis of the bearing member.

In accordance with a concomitant feature of the invention, the bearing pin of the worm gear is constructed as a journal shaft with a coupling element.

Other features which are considered as characteristic for the invention are set forth in the appended claims.

Although the invention is illustrated and described herein as embodied in electromotively driven drive equipment, especially for kitchen appliances or the like, it is nevertheless not intended to be limited to the details shown, since various modifications and structural changes may be made therein without departing from the spirt of the invention and within the scope and range of equivalents of the claims.

The construction and method of operation of the invention, however, together with additional objects and advantages thereof will be best understood from the following description of specific embodiments when read in connection with the drawing, in which.

Figure 1:
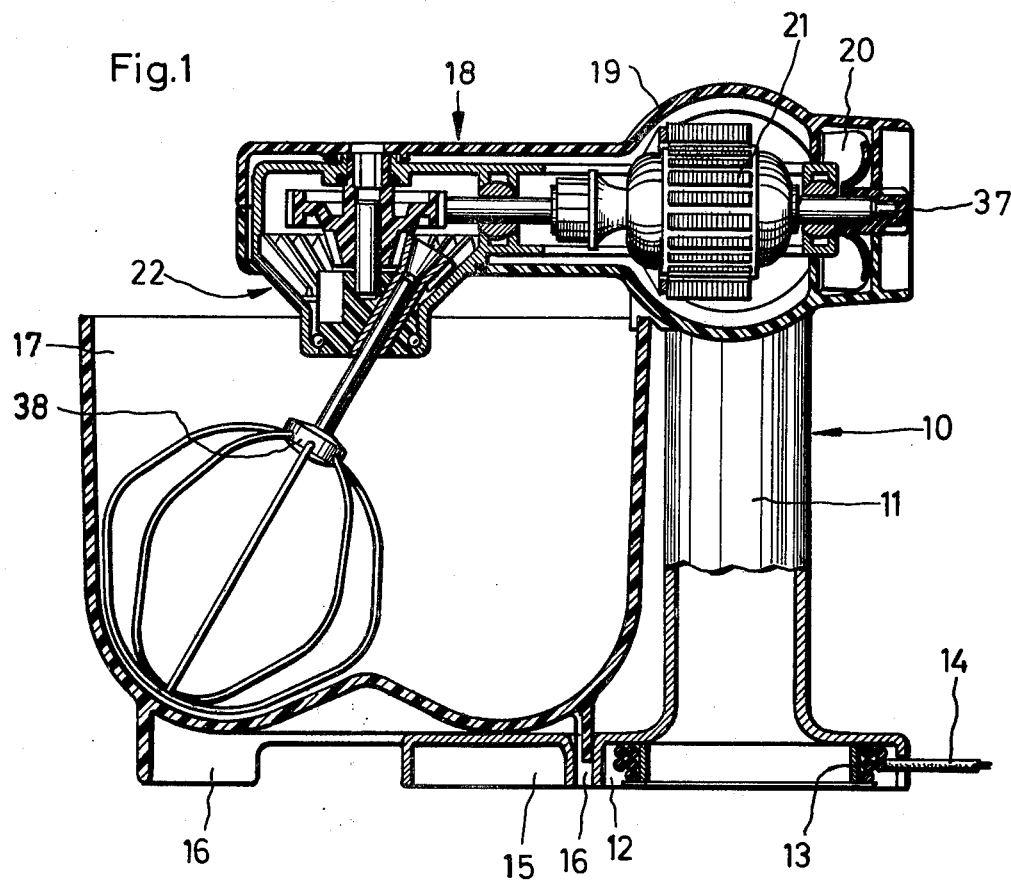
FIG. 1 is a predominantly vertical sectional view of a kitchen appliance furnished with a mixer bowl, the kitchen appliance having a drive unit disposed on a pedestal and driving a mixer brush through planetary gearing.

Referring now to the drawing and first, particularly, to FIG. 1 thereof, there is shown a kitchen appliance generally identified by the reference numeral 10 which has a pedestal 11, the lower end of which is provided with a foot or paw 12 wherein a wind-up device 13 for an electric cord 14 is disposed at the foot 12 of the pedestal 11, there is additionally located a holding device 15 into which feet 16 of a mixer bowl 17 are insertable. At the upper end of the pedestal 11 and laterally offset relative thereto, a drive unit is fastened so as to be pivotable about a horizontal axis, whereby the drive unit 18, as required, can assume the various operating positions shown in FIGS. 5 to 10. The drive unit 18 has a housing or jacket 19 which encases an electric drive motor 21, that is provided with a fan 20 and a worm shaft not visible in FIG. 1 as well as planetary gearing 22 and also various non-illustrated switching and control members.

Figure 2:
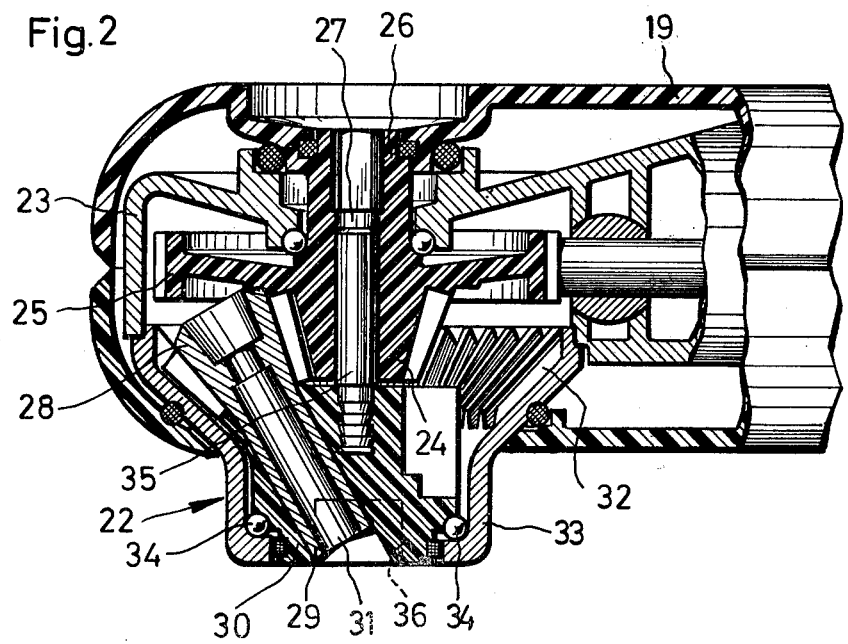
FIG. 2 is an enlarged fragmentary view of the planetary gearing of the drive unit of FIG. 1 with details thereof slightly deviating partly from that of FIG. 1.

The planetary gearing 22 enclosed by a gear cover or box 23 in which the bearing of the electric drive motor 21 is also accommodated has, as is shown especially in FIG. 2, a central gear 24 provided with a bevel toothing. This central gear 24 forms a structural unit with a worm gear 25 driven by the worm shaft of the electric drive motor 21. The worm gear 25 is provided with a bearing pin 26 on the side thereof facing away from the central gear 24. The bearing pin 26 projects as a journal shaft outwardly out of the gear box 23 and, for this purpose, is formed with a central bore 27 provided with a hollow hexagon that serves as a coupling element. The central gear 24 united with the worm gear 25 into a structural unit is mounted with the bearing pin 26 through the intermediary of steel balls at the gear box 23.

The central gear 24 drives a planet gear 28 also having a beveled toothing, the axis of the planet gear 28 intersecting the axis of the central gear 24. The planet gear 28 has a pin 29 formed on the axis thereof and seated in an inclined bore of a bearing member 30 rotatably seated on the axis of the central gear 24. The pin 29 and the planet gear 28 are formed along the common axis thereof with a through-bore 31 which serves as a coupling member for a shaft of a tool, such as a kneading hook or blade, an egg beater or the like, which is insertable into the through-bore 31.

In addition to meshing with the teeth of the central gear 24, the planet gear 28 also meshes with the teeth of an internally toothed ring gear 32 which is disposed concentrically or coaxially to the central gear 24. The ring gear 32 provided also with a beveled toothing determines the shape of the mantle or surface of a truncated cone, on the smaller-diameter side of which a hub-like appendage 33 is formed. The hub-like appendage 33 is formed with an axially symmetrical hollow chamber widening stepwise inwardly, the bearing member 30 carrying the planet gear 28 being mounted in that hollow chamber through the intermediary of steel balls 34. A bearing pin 35 seated in the axis of the bearing member 30 serves as a guide of the bearing member 30 and is, as such, inserted into the central bore of the central gear 24.

Figure 3:
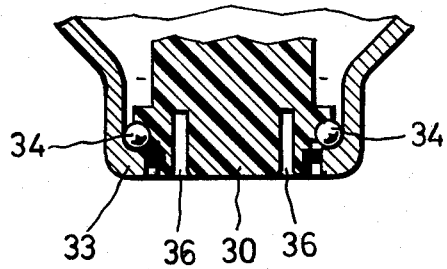
FIG. 3 is a simplified fragmentary view of FIG. 2 showing the lower section of the planetary gearing rotated through an angle of 90° about the vertical axis thereof.
Figure 4:
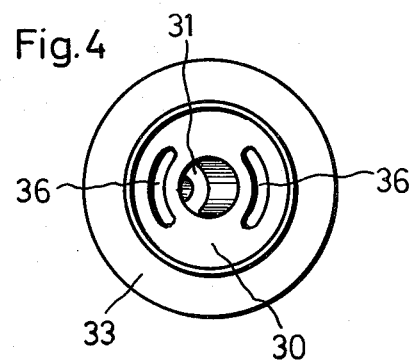
FIG. 4 is a bottom plan view of FIG. 3.
Figure 5:
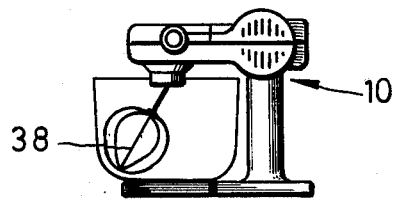
FIGS. 5 to 10 are diagrammatic views, reduced in size, of the kitchen appliance with the drive unit thereof swung into various operating positions and various tools or operating devices driven by respective journal shafts.
Figure 6:
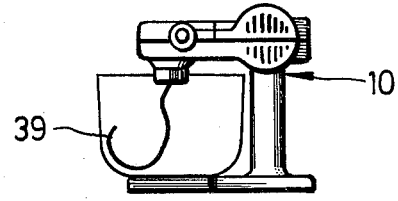
Figure 7:
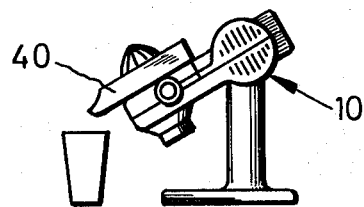
Figure 8:
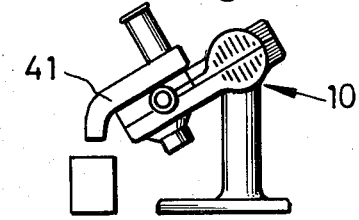
Figure 9:
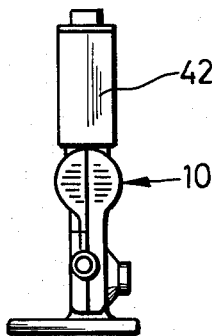
Figure 10:
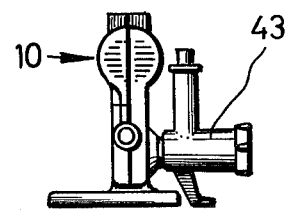

The bearing member 30 is provided with entrainer elements 36 in the form of circular segment-shaped grooves (note especially FIGS. 3 and 4) that are milled into an end face thereof and serves, in this manner, as a journal shaft with greatly reduced rotary speed. The end face of the bearing member 30 is alogned with the end face of the hub-like appendage 33 at the outer ring gear 32 so that moved parts do not project or only negligibly project from the hub-like appendage 33. In this manner, danger of an accident due to the rotating parts is largely avoided. The hub-like appendage 33 is formed on the outside thereof as a circular cylindrical body to which the most varied kitchen appliances, such as a meat grinder, for example, as shown in FIG. 10 can be reliably fastened with a suitable conventional clamping device.

In the embodiment of FIG. 1, the outer ring gear 32 and the hub-like appendage 33 are components of the gear box 23 surrounding the planetary gearing 22 and, as such, are manufactured with the gear box 23 in one piece. In contrast thereto, in the embodiment of FIG. 2, the ring gear 32 with the hub-like appendage 33 are formed as an integral structural element which, as a whole, is separately fastened to the gear box 23.

The illustrated and hereinaforedescribed planetary gearing, because of the special construction thereof, has three journal shafts from which, respectively, in accordance with the special reduction ratio, different rotary speeds for the most varying tools and utensils or devices can be taken off. A further journal shaft 37 (FIG. 1) is located at the drive unit 18 on the side of the electric drive motor 21 facing away from the planetary gearing 22, so that, at this location, the rotary speed of the rapidly rotating electric drive motor 21 can be taken off directly. In this manner, the tools and working utensils or devices, such as a mixer brush 38, a kneading hook or blade 39, a juice squeezer 40, a shredding device 41 or a mixer 42 as well as a meat grinder 43, for example, which are shown in FIGS. 5 to 10, are connected. The pivotable disposition of the drive unit 18 seated on the pedestal 11 permits the drive unit 18 to be adjustable into the most favorable position, respectively, for operating the respective tool or device.

There are claimed:

1. Electromotively driven drive unit with a planetary gearing having bevel-gear toothing and including a revolving planet gear having an inclined axis intersecting with the axis of a central gear of the planetary gearing, and a gear box for the planetary gearing having a plurality of journal shafts to which tools and devices drivable with varying rotary speeds are connectible, the improvement therein comprising an internally toothed outer ring gear disposed concentrically to the central gear of the planetary gearing, the planet gear being in meshing engagement both with the teeth of the central gear and the teeth of said ring gear, the plane gear with a pin formed thereon being seated in a bearing member rotatably disposed on the axis of the central gear, the planet gear moving together with said bearing member during a whirling movement thereof about the central gear, whereby said bearing member rotates at a slower rotary speed than said central gear.

2. The drive unit according to claim 1 including a hub-like appendage formed at said outer ring gear, said bearing member moving with the planet gear being mounted in said hub-like appendage.

3. The drive unit according to claim 2 wherein the pin formed on the planet gear extends through said bearing and is constructed as a coupling member for receiving thereon a shaft of a rotatable tool.

4. The drive unit according to claim 2 wherein said bearing member moving with the planet gear having entrainer elements and serving as a journal shaft with a greatly reduced rotary speed.

5. The drive unit according to claim 4 wherein said entrainer elements are located at the end face of said bearing member, said end face of said bearing member being in substantial alignment with the end face of said hub-like appendage.

6. The drive unit according to claim 2 wherein said outer ring gear with said hub-like appendage are components of the gear box surrounding the planetary gearing.

7. The drive unit according to claim 1 including a worm gear, the central gear being seated laterally coaxially at said worm gear.

8. The drive unit according to claim 7 wherein said worm gear seated at the central gear is provided with a bearing pin on a side thereof facing away from the central gear, and said worm gear is formed with a bore, on the side thereof on which the central gear is located, for receiving therein a bearing pin seated in the axis of said bearing member.

9. The drive unit according to claim 8 wherein said bearing pin of said worm gear is constructed as a journal shaft with a coupling element.

* * * * *